US012723135B2

(12) United States Patent
McLoughlin et al.

(10) Patent No.: US 12,723,135 B2
(45) Date of Patent: Sep. 1, 2026

(54) RECYCLED POLYMER COMPOSITIONS AND METHODS THEREOF

(71) Applicant: Braskem S.A., Camaçari (BR)

(72) Inventors: Kimberly Miller McLoughlin, Philadelphia, PA (US); Hadi Mohammadi, Philadelphia, PA (US); Michelle Kay Sing, Philadelphia, PA (US); Ana Paula de Azeredo, São Paulo City (BR); Nei Sebastião Domingues Junior, São Paulo City (BR); Murilo Lauer Sanson, São Paulo City (BR)

(73) Assignee: Braskem S.A., Camaçari (BR)

(*) Notice: Subject to any disclaimer, the term of this patent is extended or adjusted under 35 U.S.C. 154(b) by 1179 days.

(21) Appl. No.: 17/694,373

(22) Filed: Mar. 14, 2022

(65) Prior Publication Data

US 2022/0289916 A1 Sep. 15, 2022

Related U.S. Application Data

(60) Provisional application No. 63/239,655, filed on Sep. 1, 2021, provisional application No. 63/160,631, filed on Mar. 12, 2021.

(51) Int. Cl.

| | |
|---|---|
| ***C08J 3/24*** | (2006.01) |
| ***C08J 3/22*** | (2006.01) |

(Continued)

(52) U.S. Cl.

CPC . *C08J 3/24* (2013.01); *C08J 3/22* (2013.01); *C08J 9/0023* (2013.01); *C08J 9/0066* (2013.01);

(Continued)

(58) Field of Classification Search

CPC .. C08F 2810/20; C08F 210/02; C08F 210/04; C08F 210/06; C08F 210/08;

(Continued)

(56) References Cited

U.S. PATENT DOCUMENTS

| | | | | |
|---|---|---|---|---|
| 6,090,862 | A | 7/2000 | Tatsuda et al. | |
| 2003/0187084 | A1* | 10/2003 | Bandolini | C08J 9/0061 521/50 |

(Continued)

FOREIGN PATENT DOCUMENTS

| | | | |
|---|---|---|---|
| CN | 111218054 | A | 6/2020 |
| JP | H1086152 | A | 4/1998 |

(Continued)

OTHER PUBLICATIONS

Guo et al. Macromolecules 2020, 53, 458-464 (Year: 2020).*

Yue, L.; Guo, H.; Kennedy, A.; Patel, A.; Gong, X.; Ju, T.; Gray, T.; Manas-Zloczower, I. Vitrimerization: converting thermoset polymers into vitrimers. Acs Macro Letters 2020, vol. 9, n. 6, pp. 836-842. (7 pages).

International Search Report issued in corresponding International Application No. PCT/IB2022/020004; mailed May 9, 2022 (4 pages).

(Continued)

*Primary Examiner* — Mark S Kaucher

(74) *Attorney, Agent, or Firm* — Osha Bergman Watanabe & Burton LLP

(57) ABSTRACT

A method may include processing a crosslinked polymer and a catalyst to form a vitrimer during a melt processing operation, the crosslinked polymer comprising at least one monomer selected from a vinyl ester, a C2-C12 olefin, and combinations thereof. A method may include mixing a crosslinked polymer, a catalyst, and a non-crosslinked polymer at a temperature higher than a processing temperature of the non-crosslinked polymer to form a polymer composition; wherein each of the crosslinked polymer and the non-crosslinked polymer comprise at least one monomer selected from a vinyl ester, a C2-C12 olefin, and combinations thereof, and wherein the crosslinked polymer is present (Continued)

in an amount that is at least 15 wt %, relative to the combined total of crosslinked polymer and non-crosslinked polymer.

23 Claims, 10 Drawing Sheets

(51) Int. Cl.
*C08J 9/00* (2006.01)
*C08J 9/10* (2006.01)
*C08J 11/26* (2006.01)

(52) U.S. Cl.
CPC ............... *C08J 9/103* (2013.01); *C08J 11/26* (2013.01); *C08J 2201/03* (2013.01); *C08J 2207/00* (2013.01); *C08J 2323/08* (2013.01); *C08J 2331/04* (2013.01)

(58) Field of Classification Search
CPC .... C08F 210/10; C08F 210/14; C08F 218/08; C08L 2207/20; C08L 23/0853; C08L 2205/22; C08J 3/24; C08J 2331/04
See application file for complete search history.

(56) References Cited

U.S. PATENT DOCUMENTS

| | | | | |
|---|---|---|---|---|
| 2009/0301751 | A1 | 12/2009 | Iwasaki et al. | |
| 2014/0066530 | A1* | 3/2014 | Shen | C08K 3/013 521/134 |
| 2018/0312657 | A1 | 11/2018 | Yue et al. | |
| 2021/0102014 | A1 | 4/2021 | Hanlon et al. | |

FOREIGN PATENT DOCUMENTS

| | | | |
|---|---|---|---|
| JP | 2009298830 | A | 12/2009 |
| JP | 2014065844 | A | 4/2014 |
| WO | 2019160632 | A1 | 8/2019 |

OTHER PUBLICATIONS

Written Opinion of the International Searching Authority issued in corresponding International Application No. PCT/IB2022/020004; mailed May 9, 2022 (9 pages).
Notice of Reasons for Rejection issued in corresponding Japanese Application No. 2023-555620 mailed Mar. 17, 2026 (20 pages).

* cited by examiner

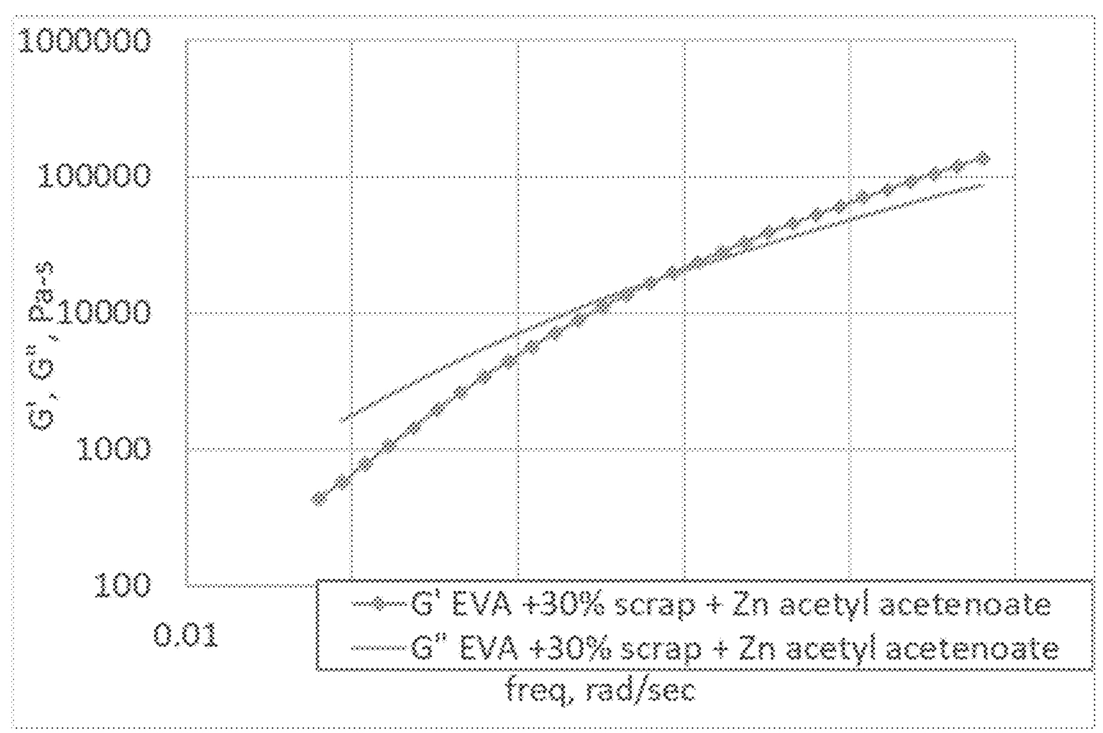
*FIG. 8*
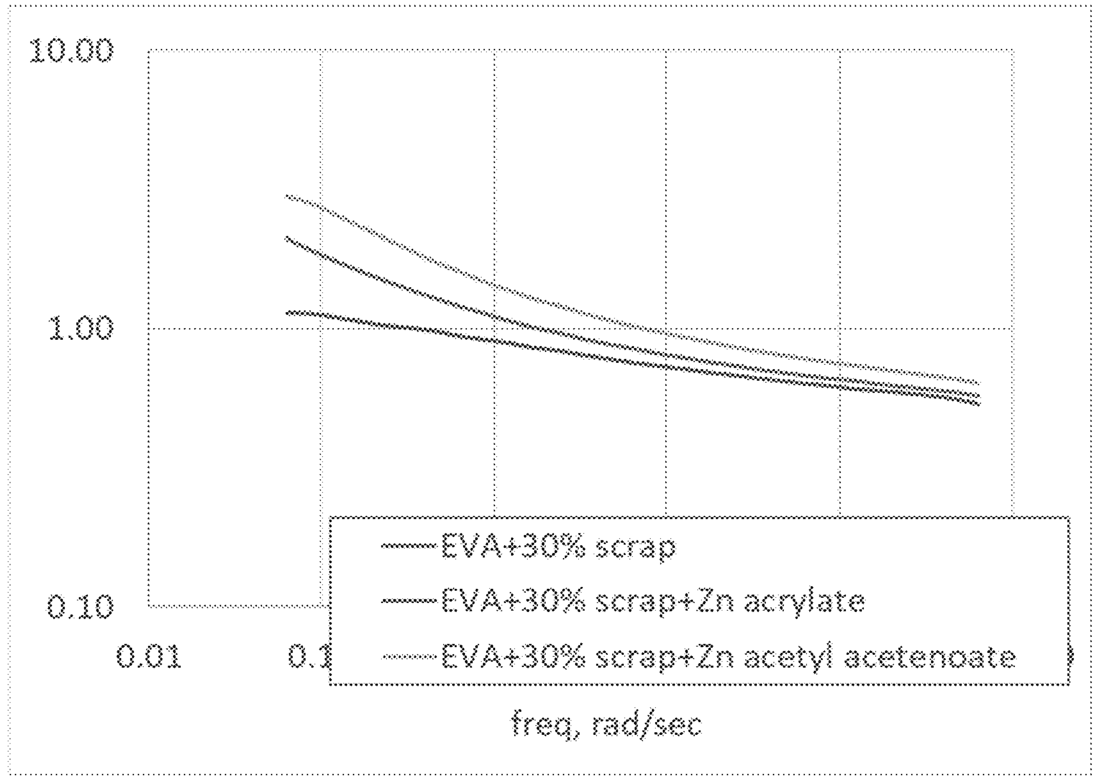
*FIG. 9* - Tan Delta (170C)

EVA+30% scrap
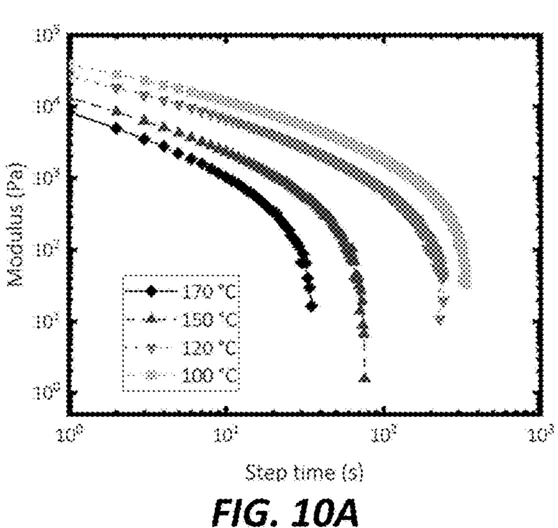
FIG. 10A
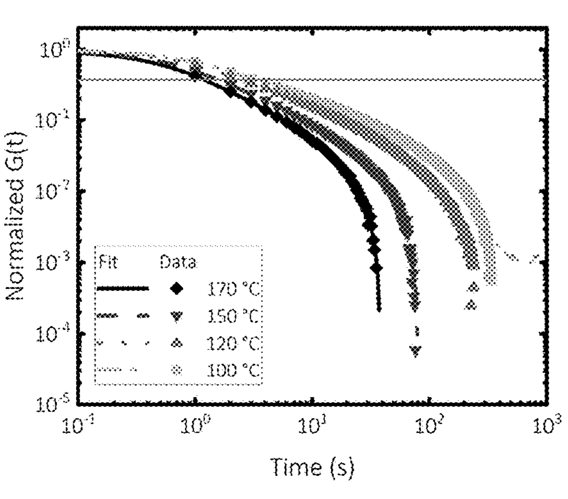
FIG. 10B
EVA+30% scrap+Zn diacrylate
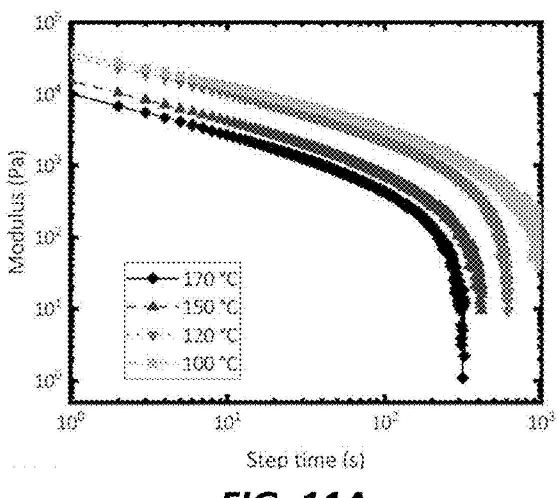
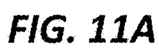
FIG. 11A
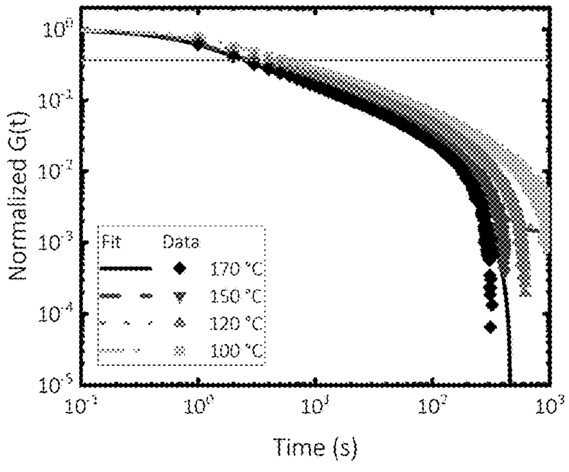
FIG. 11B EVA+30% scrap+Zn acetyl acetenoate 30% EVA scrap+ Zn acetyl acetenoate

RECYCLED POLYMER COMPOSITIONS AND METHODS THEREOF

BACKGROUND

Ethylene vinyl acetate (EVA) is widely used to produce foams with light weight and very high toughness, resilience, and compression set. EVA foams find application in demanding applications such as running shoe midsoles as well as automotive and construction applications such as interior padding, carpet underlay, gaskets, etc. The polymer architecture that is required for EVA shoe midsoles and other foam applications is a three dimensional network, produced by crosslinking neighboring polymer molecules.

Dynamically crosslinked polymer networks provide a balance of performance, properties, and durability. However, the same characteristics that make permanent networks excellent candidates in materials selection for high performance foams represent a difficult environmental challenge. Once formed, these network structures do not melt, flow, or dissolve to enable the use of conventional reprocessing or recycling methods.

The industrial scrap produced during processing of permanent networks cannot be fully reintroduced to the manufacturing process as a secondary feedstock and only a small fraction of industrial waste from crosslinked polymers is ground and reintroduced as filler. Likewise, end-of-life parts produced from permanently crosslinked polymers have limited recycling options such as energy intensive grinding operations that generate only low value materials. As a result, a significant proportion of industrial scrap and end-of-life parts accumulates as environmental waste.

In addition to a significant environmental impact, the fact that covalent, crosslinked EVA foams cannot by reprocessed by melting represents a significant cost for manufacturers. The high amount of waste limits the utilization rate of primary materials and generates cost to handle waste.

There is a need for technology that enables re-processing of crosslinked polymers, especially crosslinked foam EVA.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a method includes processing a crosslinked polymer and a catalyst to form a dynamic crosslinked polymer during a melt processing operation, the crosslinked polymer comprising at least one monomer selected from a vinyl ester, a C2-C12 olefin, and combinations thereof.

In another aspect, embodiments disclosed herein relate to a method that includes mixing a crosslinked polymer, a catalyst, and a non-crosslinked polymer at a temperature higher than a processing temperature of the non-crosslinked polymer to form a polymer composition; wherein each of the crosslinked polymer and the non-crosslinked polymer comprise at least one monomer selected from a vinyl ester, a C2-C12 olefin, and combinations thereof, and wherein the crosslinked polymer is present in an amount that is at least 15 wt %, relative to the combined total of crosslinked polymer and non-crosslinked polymer.

In another aspect, embodiments disclosed herein relate to a thermoplastic polymer composition produced from processing a crosslinked polymer and a catalyst to form a dynamic crosslinked polymer during a melt processing operation, the crosslinked polymer comprising at least one monomer selected from a vinyl ester, a C2-C12 olefin, and combinations thereof.

In another aspect, embodiments disclosed herein relate to a thermoplastic polymer composition produced from mixing a crosslinked polymer, a catalyst, and a non-crosslinked polymer at a temperature higher than a processing temperature of the non-crosslinked polymer to form a polymer composition; wherein each of the crosslinked polymer and the non-crosslinked polymer comprise at least one monomer selected from a vinyl ester, a C2-C12 olefin, and combinations thereof, and wherein the crosslinked polymer is present in an amount that is at least 15 wt %, relative to the combined total of crosslinked polymer and non-crosslinked polymer.

In yet another aspect, embodiments disclosed herein relate to an article that includes a thermoplastic polymer composition produced from processing a crosslinked polymer and a catalyst to form a dynamic crosslinked polymer during a melt processing operation, the crosslinked polymer comprising at least one monomer selected from a vinyl ester, a C2-C12 olefin, and combinations thereof.

In yet another aspect, embodiments disclosed herein relate to an article that includes a thermoplastic polymer composition produced from mixing a crosslinked polymer, a catalyst, and a non-crosslinked polymer at a temperature higher than a processing temperature of the non-crosslinked polymer to form a polymer composition; wherein each of the crosslinked polymer and the non-crosslinked polymer comprise at least one monomer selected from a vinyl ester, a C2-C12 olefin, and combinations thereof, and wherein the crosslinked polymer is present in an amount that is at least 15 wt %, relative to the combined total of crosslinked polymer and non-crosslinked polymer.

In yet another aspect, embodiments disclosed herein relate to a method of manufacturing a printed article that includes successively printing layers of a polymer composition produced from processing a crosslinked polymer and a catalyst to form a dynamic crosslinked polymer during a melt processing operation, the crosslinked polymer comprising at least one monomer selected from a vinyl ester, a C2-C12 olefin, and combinations thereof.

In yet another aspect, embodiments disclosed herein relate to a method of manufacturing a printed article that includes successively printing layers of a polymer composition produced from mixing a crosslinked polymer, a catalyst, and a non-crosslinked polymer at a temperature higher than a processing temperature of the non-crosslinked polymer to form a polymer composition; wherein each of the crosslinked polymer and the non-crosslinked polymer comprise at least one monomer selected from a vinyl ester, a C2-C12 olefin, and combinations thereof, and wherein the crosslinked polymer is present in an amount that is at least 15 wt %, relative to the combined total of crosslinked polymer and non-crosslinked polymer.

In yet another aspect, embodiments disclosed herein relate to a method of reprocessing a polymer composition that incudes reprocessing a polymer composition produced from processing a crosslinked polymer and a catalyst to form a dynamic crosslinked polymer during a melt processing operation, the crosslinked polymer comprising at least one monomer selected from a vinyl ester, a C2-C12 olefin, and combinations thereof. The reprocessing is above a melting or softening temperature of the thermoplastic polymer, wherein after the reprocessing, the polymer composition maintains at least 40% of its initial storage modulus plateau above its melting temperature, as measured by dynamic mechanical analysis, as compared to the polymer composition before the reprocessing.

In yet another aspect, embodiments disclosed herein relate to a method of reprocessing a polymer composition that incudes reprocessing a polymer composition produced from mixing a crosslinked polymer, a catalyst, and a non-crosslinked polymer at a temperature higher than a processing temperature of the non-crosslinked polymer to form a polymer composition; wherein each of the crosslinked polymer and the non-crosslinked polymer comprise at least one monomer selected from a vinyl ester, a C2-C12 olefin, and combinations thereof, and wherein the crosslinked polymer is present in an amount that is at least 15 wt %, relative to the combined total of crosslinked polymer and non-crosslinked polymer. The reprocessing is above a melting or softening temperature of the thermoplastic polymer, wherein after the reprocessing, the polymer composition maintains at least 40% of its initial storage modulus plateau above its melting temperature, as measured by dynamic mechanical analysis, as compared to the polymer composition before the reprocessing.

Other aspects and advantages of the claimed subject matter will be apparent from the following description and the appended claims.

BRIEF DESCRIPTION OF DRAWINGS

FIGS. 6-9 show viscoelastic responses at 170° C.

FIGS. 10A-12B show stress relaxation results of various samples. FIGS. 10A, 11A, and 12A demonstrate the magnitude of the stress relaxation behavior, and FIGS. 10B, 11B, and 12B represent the normalized stress relaxation. Horizontal lines in the normalized graphs indicate the location where the normalized modulus reaches a value of 1/e.

DETAILED DESCRIPTION

Figure 1:
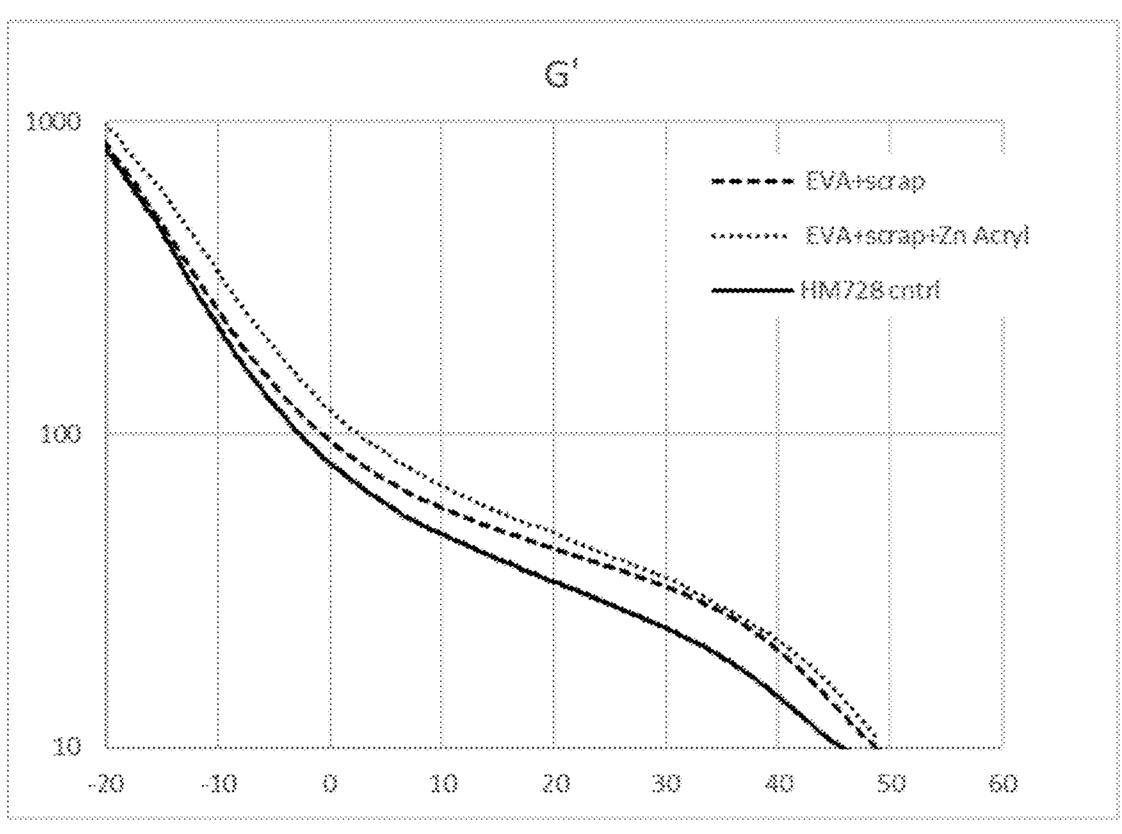
FIGS. 1-3 show DMA testing results.

Embodiments disclosed herein relate to polymer compositions and methods of forming such polymer compositions. The polymer compositions may be formed from re-processing of crosslinked polymers in the presence of a catalyst to form a dynamic crosslinked polymer. In particular, such crosslinked polymers subjected to the re-processing may include polymers formed from an olefin, a vinyl ester or combinations thereof. Embodiments may also include a non-crosslinked polymer combined with the crosslinked polymer and the catalyst, such that the resulting polymer composition may have a multiphasic structure.

Dynamic crosslinked polymers refer to dynamic crosslinked systems, also called "ionic or covalent adaptable networks", which are a class of chemically crosslinked polymers, in which an external-stimulus (temperature, stress, pH, etc.) triggers bond-exchange reactions, thereby permitting the change of the network topology while keeping the number of bonds and crosslinks constant. The dynamic bonds present in dynamic crosslinked polymers can undergo associative exchange reactions, such that the network topology is able to change, the material relaxes stresses and flows even though the total number of bonds remains constant in time and does not fluctuate at all times and temperatures. Dynamic crosslinked polymers exhibit the characteristics of crosslinked materials at ambient temperatures (high chemical resistance, exceptional mechanical properties), while they can be processed or reprocessed as thermoplastic materials at elevated temperature.

In accordance with one or more embodiments, crosslinked polymers, which could otherwise not be re-processed, may be mixed or processed along with a catalyst and an optional non-crosslinked polymer. Such mixing or processing may occur, for example, in an extruder to transform the crosslinked polymer into a dynamic crosslinked polymer, thereby transforming the permanent covalent crosslinks in the crosslinked polymer into adaptable networks. Advantageously, embodiments of the present disclosure may allow for the increased incorporation of scrap or recycled crosslinked materials in polymer compositions, thereby reducing the amount of waste. Further it is envisioned that such polymer compositions incorporating a high degree of crosslinked polymer may still possess the desired properties such as tensile elongation at break, tensile stress at break, flexural modulus, and/or Izod impact resistance that is desired for a particular application, such as by modifying the amount, type, and properties of the non-crosslinked polymer. In one or more embodiments, the present polymer composition (when crosslinked) may possess one or more of such properties that is at least equal to or greater than that of the crosslinked polymer alone. However, it is also envisioned that for some applications, it may be acceptable (or even desirable) for the properties to be less than that of the crosslinked polymer alone. Further, articles formed from the polymer compositions may have stress and elongation at break, hardness, compression set, impact strength, density, tear strength, resilience, abrasion resistance, etc., that is equivalent to that formed from a non-crosslinked polymer without the dynamic crosslinked polymer therein. That is, the inclusion of the dynamic crosslinked polymer within a matrix of the non-crosslinked polymer does not have a negative impact on the properties of the article.

Crosslinked Polymer

As discussed, embodiments of the present disclosure may allow for increased incorporation of previously crosslinked polymer incorporated therein.

In one or more embodiments, the crosslinked polymer includes at least one monomer selected from C2-C12 olefins such as ethylene, propylene, butene, pentene, hexene, heptene, octene, nonene, decene, undecene, dodecene, etc.; a vinyl ester such as vinyl acetate, vinyl propionate, vinyl laurate, vinyl esters of versatic acid, etc.; and combinations thereof. Thus, for example, it is envisioned that the crosslinked polymer may include polymers such as polyethylene including high density polyethylene, low density polyethylene, linear low density polyethylene, very low density polyethylene; polypropylene, ethylene and/or propylene based copolymers such as ethylene/propylene copolymers ethylene vinyl acetate, ethylene propylene diene monomer (EPDM), ethylene/styrene copolymers, ethylene/acrylate copolymers; and poly(vinyl acetate). In copolymers of an olefin and vinyl ester(s), it is envisioned that the vinyl ester(s) may be present as comonomers in an amount ranging from a lower limit of 1, 5, 10, 15, 18, or 20%, to an upper limit of any of 25, 40, 60, or 80%. In one or more particular embodiments, vinyl acetate may be used as monomer or comonomer.

It is also envisioned that the crosslinked polymer may include a branched vinyl ester comonomer (in combination with ethylene alone to form a copolymer or in combination with ethylene and vinyl acetate to form a terpolymer. Such copolymer and terpolymers are described in U.S. patent application Ser. No. 17/063,488, which is herein incorporated by reference in its entirety. For example, such branched vinyl ester monomers may include monomers having general structure (I):

(I)

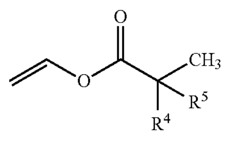

wherein $R^4$ and $R^5$ have a combined carbon number of 6 or 7. However, it is also envisioned that the other branched vinyl esters described in U.S. patent application Ser. No. 17/063,488 may be used.

In referring to a crosslinked polymer that forms the polymer composition described herein, it is intended that the polymer is crosslinked (containing permanent covalent bonds) prior to addition with a catalyst, such that subsequent to processing in the presence of the catalyst, the permanent crosslinks of the crosslinked polymer are transformed into dynamic crosslinked systems, i.e., a dynamic crosslinked polymer.

In one or more embodiments, the crosslinked polymer is previously-processed, thus indicating that it has been subjected to one or more prior processing steps resulting in the formation of covalent crosslinks, prior to being mixed/processed with the catalyst, such as, but not limited to crosslinking in autoclaves, hot air tunnels, with UV radiation, foaming, melt processing, injection or compression molding, etc. Further, it is also envisioned that in one or more embodiments, the crosslinked polymer could also have been previously compounded with one or more additives or fillers, while in other embodiments, it may be a crosslinked polymer without such additional components. Thus, in one or more embodiments, the crosslinked polymer is a recycled resin, such as a post-consumer resin, a post-industrial resin, or otherwise a scrap material that would otherwise be unusable for re-processing due to the covalent crosslinking present. Generally, once such crosslinking is formed, these network structures do not melt, flow, or dissolve to enable the use of conventional reprocessing or recycling methods. For example, in one or more particular embodiments, the crosslinked polymer is either scrap from molding an EVA midsole shoe or may be recycled shoe soles. Thus, for example, such previously-processed crosslinked polymer may have been previously molded or extruded, and the subsequent sprue, runners, flash, rejected parts, and the like, are ground or chopped, and combined with a catalyst to transform the crosslinked polymer into a dynamic crosslinked network.

Further, it is also understood that crosslinked polymers may arise from other industrial manufacturing processes as scrap or as recycled articles that cannot otherwise be reused due to the presence of crosslinks. However, the present embodiments overcomes the technical barriers associated with permanent nature of the covalent bonds that hold crosslinked polymer networks together by replacing permanent crosslinks with a new class of vitrimers to produce polymer networks capable of undergoing topological rearrangements under certain environmental conditions.

In one or more embodiments, the crosslinked polymer, e.g., a scrap polymer, forms at least 5 wt %, 10 wt %, 15 wt %, at least 20 wt %, at least 25 wt %, or at least 50 wt % of the polymer composition, including the composition consisting of the crosslinked polymer, the catalyst, and one or more optional non-polymeric additives, i.e., without a non-crosslinked polymer.

Catalyst

In one or more embodiments, the crosslinked polymer is combined with a catalyst that facilitates the exchange reactions for the dynamic crosslinks described above. In one or more embodiments, the catalyst is a metal salt selected from the group consisting of metal salts, metal oxides, metal alkoxides, metal acrylates, metal acetyl acetenoates, metal hydrides, metal halides, and metal hydroxides. Such metals may include, basic metals, alkaline earth metals, transition metals, and rare earth metals, for example, zinc, tin, molybdenum, vanadium, copper, tungsten, magnesium, cobalt, calcium, titanium, potassium, lithium, sodium, nickel, aluminum, lead, iron, and zirconium.

In one or more embodiments, the catalyst is selected from borates, diamines, diols, diacids, dianhydrides, and combination thereof. In one or more embodiments, these catalysts may be used in the combination with the metal salt catalyst described before.

In one or more embodiments, the catalyst is present in an amount greater than 2 mol %, relative to the crosslinked polymer. It is envisioned that it may be desirable to add catalyst in an amount sufficient to create dynamic crosslinked within the crosslinked polymer, as well as the non-crosslinked polymer, and to form bridges between the two.

Non-Crosslinked Polymer

In one or more embodiments, the non-crosslinked polymer includes at least one monomer selected from C2-C12 olefins such as ethylene, propylene, butene, pentene, hexene, heptene, octene, nonene, decene, undecene, dodecene, etc.; a vinyl ester such as vinyl acetate, vinyl propionate, vinyl laurate, vinyl esters of versatic acid, etc.; and combinations thereof. Thus, for example, it is envisioned that the non-crosslinked polymer may include polymers such as polyethylene including high density polyethylene, low density polyethylene, linear low density polyethylene, very low density polyethylene; polypropylene, ethylene and/or propylene based copolymers such as ethylene/propylene copolymers ethylene vinyl acetate, ethylene propylene diene monomer (EPDM), ethylene/styrene copolymers, ethylene/acrylate copolymers; and poly(vinyl acetate). In copolymers of an olefin and vinyl ester(s), it is envisioned that the vinyl ester(s) may be present as comonomers in an amount ranging from a lower limit of 5, 10, 15, 18, or 20%, to an upper limit of any of 25, 40, 60, or 80%. In one or more particular embodiments, vinyl acetate may be used as monomer or comonomer. The ethylene vinyl acetate may have a melt flow, measured according to ASTM D1238, 2.16 kg at 190° C., ranging from 0.1 to 300 g/10 min.

It is also envisioned that the non-crosslinked polymer may include a branched vinyl ester comonomer (in combination with ethylene alone to form a copolymer or in combination with ethylene and vinyl acetate to form a terpolymer). Such copolymer and terpolymers are described in U.S. patent application Ser. No. 17/063,488, which is herein incorporated by reference in its entirety. For example, such branched vinyl ester monomers may include monomers having general structure (II):

(I)

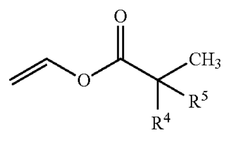

wherein $R^4$ and $R^5$ have a combined carbon number of 7.

In one or more embodiments, the non-crosslinked polymer forms less than 85 wt %, less than 80 wt %, less than 75 wt % or less than 50 wt % of the polymer composition.

Upon combination of the crosslinked polymer, catalyst, and the non-crosslinked polymer, the resulting polymer composition may be multiphasic, having a matrix phase of the non-crosslinked polymer in which dispersed phases of a dynamically crosslinked polymer are present. Further, it is also envisioned that depending on the mixing or processing conditions, dynamic crosslinked polymers may be formed on the surface of the dispersed phases, in the matrix phase, and at the interface between the two phases.

Optional Additives

The polymer composition of the present disclosure may also include, in addition to crosslinked polymer, catalyst, and optional non-crosslinked polymer, one or more optional additives such as, but not limited to fillers, blowing agents, blowing accelerants, curing agents, crosslinking agents, free radical initiators, elastomer, plasticizer, processing aid, mold release, lubricant, dye, pigment, antioxidants, light stabilizers flame retardant, or other additives to modify the balance of stiffness and elasticity in the polymer composition, such as fibers, fillers, and other reinforcement elements. In some embodiments, one or more of such additives may be added during the initial mixing or melt processing of the crosslinked polymer and catalyst, while in one or more embodiments, one or more of such additives may be compounded in a subsequent process step.

Polymer compositions in accordance with the present disclosure may include one or more blowing accelerators (also known as kickers) that enhance or initiate the action of a blowing agent by lower the associated activation temperature. For example, blowing accelerators may be used if the selected blowing agent reacts or decomposes at temperatures higher than 170° C., such as 220° C. or more, where the surrounding polymer would be degraded if heated to the activation temperature. Blowing accelerators may include any suitable blowing accelerator capable of activating the selected blowing agent. In one or more embodiments, suitable blowing accelerators may include cadmium salts, cadmium-zinc salts, lead salts, lead-zinc salts, barium salts, barium-zinc (Ba—Zn) salts, zinc oxide, titanium dioxide, triethanolamine, diphenylamine, sulfonated aromatic acids and their salts, and the like. Polymer compositions in accordance with particular embodiments of the present disclosure may include zinc oxide as one of the one or more blowing accelerators. In some embodiments, blowing accelerators may be included in the elastomeric EVA compositions in addition to, or instead of, the polymer composition itself.

Polymer compositions in accordance with the present disclosure may include one or more blowing agents to produce expanded polymer compositions and foams. Blowing agents may include solid, liquid, or gaseous blowing agents. In embodiments utilizing solid blowing agents, blowing agents may be combined with a polymer composition as a powder or granulate.

Blowing agents in accordance with the present disclosure may include chemical blowing agents that decompose at polymer processing temperatures, releasing the blowing gases such as $N_2$, CO, $CO_2$, and the like. Examples of chemical blowing agents may include organic blowing agents, including hydrazines such as toluenesulfonyl hydrazine, hydrazides such as oxydibenzenesulfonyl hydrazide, diphenyl oxide-4,4'-disulfonic acid hydrazide, and the like, nitrates, azo compounds such as azodicarbonamide, cyanovaleric acid, azobis(isobutyronitrile), and N-nitroso compounds and other nitrogen-based materials, and other compounds known in the art.

Inorganic chemical blowing agents may include carbonates such as sodium hydrogen carbonate (sodium bicarbonate), sodium carbonate, potassium bicarbonate, potassium carbonate, ammonium carbonate, and the like, which may be used alone or combined with weak organic acids such as citric acid, lactic acid, or acetic acid.

Polymer compositions in accordance with the present disclosure may contain one or more plasticizers to adjust the physical properties and processability of the composition. In some embodiments, plasticizers in accordance with the present disclosure may include one or more of bis(2-ethylhexyl) phthalate (DEHP), di-isononyl phthalate (DINP), bis (n-butyl) phthalate (DNBP), butyl benzyl phthalate (BZP), di-isodecyl phthalate (DIDP), di-n-octyl phthalate (DOP or DNOP), di-o-octyl phthalate (DIOP), diethyl phthalate (DEP), di-isobutyl phthalate (DIBP), di-n-hexyl phthalate, trimethyl trimellitate (TMTM), tri-(2-ethylhexyl) trimellitate (TEHTM-MG), tri-(n-octyl, n-decyl) trimellitate, tri-(heptyl, nonyl) trimellitate, n-octyl trimellitate, bis (2-ethylhexyl) adipate (DEHA), dimethyl adipate (DMD), monomethyl adipate (MMAD), dioctyl adipate (DOA)), dibutyl sebacate (DBS), polyesters of adipic acid such as VIERNOL, dibutyl maleate (DBM), di-isobutyl maleate (DIBM), benzoates, epoxidized soybean oils, n-ethyl toluene sulfonamide, n-(2-hydroxypropyl) benzene sulfonamide, n-(n-butyl) benzene sulfonamide, tricresyl phosphate (TCP), tributyl phosphate (TBP), glycols/polyesters, triethylene glycol dihexanoate, 3gh), tetraethylene glycol di-heptanoate, polybutene, acetylated monoglycerides; alkyl citrates, triethyl citrate (TEC), acetyl triethyl citrate, tributyl citrate, acetyl tributyl citrate, trioctyl citrate, acetyl trioctyl citrate, trihexyl citrate, acetyl trihexyl citrate, butyryl trihexyl citrate, trihexyl o-butyryl citrate, trimethyl citrate, alkyl sulfonic acid phenyl ester, 2-cyclohexane dicarboxylic acid di-isononyl ester, nitroglycerin, butanetriol trinitrate, dinitrotoluene, trimethylolethane trinitrate, diethylene glycol dinitrate, triethylene glycol dinitrate, bis (2,2-dinitropropyl) formal, bis (2,2-dinitropropyl) acetal, 2,2,2-trinitroethyl 2-nitroxyethyl ether, mineral oils, among other plasticizers and polymeric plasticizers. In particular embodiments, one of the one or more plasticizers may be mineral oil.

Polymer compositions in accordance with the present disclosure may include one or more inorganic fillers such as talc, glass fibers, marble dust, cement dust, clay, carbon black, feldspar, silica or glass, fumed silica, silicates, calcium silicate, silicic acid powder, glass microspheres, mica, metal oxide particles and nanoparticles such as magnesium oxide, antimony oxide, zinc oxide, inorganic salt particles and nanoparticles such as barium sulfate, wollastonite, alumina, aluminum silicate, titanium oxides, calcium carbonate, polyhedral oligomeric silsesquioxane (POSS), recycled EVA, and other recycled rubbers. As defined herein, recycled EVA may be derived from regrind materials that have undergone at least one processing method such as molding or extrusion and the subsequent sprue, runners, flash, rejected parts, and the like, are ground or chopped. While in accordance with embodiments of the present disclosure such recycled materials are combined with a catalyst to form the polymer composition described herein which has dynamic crosslinked networks, it is also envisioned that additional recycled EVA or other polymer may be added as filler in a subsequent compounding step.

Processing

In one or more embodiments, the crosslinked polymer, the catalyst, and optional non-crosslinked polymer are subjected to a melt-processing operation to form a dynamic crosslinked polymer and the claimed polymer composition. Specifically, the crosslinked polymer, catalyst, and optional non-crosslinked polymer may be mixed at an elevated temperature to reduce the viscosity of the crosslinked polymer and increase the dynamic crosslinking reaction rate. For example, a mixture of crosslinked polymer, catalyst, and non-crosslinked polymer may be subjected to a processing temperature greater than a processing temperature of the non-crosslinked polymer to form the polymer composition. That is, the mixture may be subjected to temperatures higher than either the melting or softening point of the non-crosslinked polymers. The temperature shall be selected according to requirements for the selected processing operation, as long it does not exceed the polymers' degradation temperature. The softening point of an amorphous non-crosslinked polymer (is determined by a Vicat method according to ASTM D-1525, and the melting point of a semi-crystalline non-crosslinked polymer is measured according to DSC.

In one or more embodiments, polymer compositions in accordance with the present disclosure may be prepared using continuous or discontinuous extrusion or in a continuous or batch mixing. Methods may use single-, twin- or multi-screw extruders, which may be used at temperatures ranging from 100° C. to 270° C. in some embodiments, and from 140° C. to 230° C. in some embodiments. In some embodiments, raw materials (crosslinked polymer, catalyst, and non-crosslinked polymer are added to an extruder, simultaneously or sequentially, into the main or secondary feeder. Other embodiments may use a kneader, calender, or other internal mixers.

Methods of preparing polymer compositions in accordance with the present disclosure may include the general steps of combining a crosslinked polymer, a catalyst, and optionally a non-crosslinked polymer in an extruder; melt extruding the crosslinked polymer with the catalyst to form a dynamic crosslinked polymer and optionally to disperse such dynamic crosslinked polymer within a non-crosslinked polymer; and forming pellets, filaments, or powder of the polymer composition.

Advantageously, processes of the present disclosure may be continuous such that crosslinked polymer and catalyst may be constantly and continuously added to the process (such as at a first end of an extruder), and the polymer composition formed may be constantly and continuously formed at the end of the process (such as at a second end of the extruder). That is, additional crosslinked polymer and catalyst are added to the process (at a first end of the extruder) simultaneous with the formed polymer composition resulting from the process (at the second end of the extruder).

In one or more embodiments, the crosslinked polymer, particularly sourced from scrap or molded parts, may be broken in into smaller particles. It is envisioned that such size reduction may, in one or more embodiments, occur during extrusion of the crosslinked polymers with the catalyst. However, it is also envisioned that the at least a portion of the size reduction may occur in a prior step of grinding, milling, or otherwise chopping the larger scrap pieces into particles that may be readily fed into an extruder and/or that have sufficient surface area to react with the catalyst to dynamically crosslink during the extrusion process. For example, the crosslinked polymer, after size reduction, and subjected to the dynamic crosslinking, may have a particle size of with a lower limit of any of 1, 5, 10, 15, 20, 30, 40, 50, or 100 microns, and an upper limit of any of 100, 500, 1000, 5000, 10000 or 100000 microns, where any lower limit can be used in combination with any upper limit.

In one or more embodiments, upon dynamic crosslinking, the time-dependence of the elastic storage modulus at temperatures greater than 90° C. shifts relative to the neat composition. The time-dependence of the composition can be determined as the time at which the normalized relaxation reaches 1/e relative to the initial value (Go, plateau modulus). The value for normalized relaxation modulus may be obtained via exponential decay fits to the elastic storage modulus data. The plateau modulus corresponds to the fit at t=0 s, which is also referred to as Go.

Given the dynamic crosslinking, embodiments of the present disclosure also relate to reprocessing of a crosslinked polymer composition. In one or more embodiments, because of intrinsic properties of the used chemistries, the crosslinked polymer formulation may be reprocessed or recycled using similar processing applied to a virgin polymer in the initial crosslinking process. Scrap or end-of-life parts may undergo regrinding or other required process to feed the material in the desired operation, with acceptable decrease in processibility or properties, in a way that it is still useful as secondary feedstock. The intent is that, in general, the reprocessing parameters are similar to what is used for the initial manufacturing process. Advantageously, the polymer compositions may be reprocessed and the properties of the polymer composition may be substantially maintained as compared to immediately prior to the reprocessing. Specifically, in one or more embodiments, after the reprocessing, the polymer composition maintains at least 40% of its initial storage modulus plateau above its melting temperature, as measured by dynamic mechanical analysis, as compared to the polymer composition before the reprocessing.

It is also envisioned that the reprocessing occurs repeatedly (through multiple cycles). In one or more embodiments, after the repeated reprocessing, such as after 3 or even after 5 cycles of reprocessing, the polymer composition maintains at least 40% of its initial storage modulus plateau above its melting temperature, as measured by dynamic mechanical analysis, as compared to the polymer composition before the reprocessing.

Polymer compositions prepared by the present methods may be in the form of granules that are applicable to different molding processes, including processes selected injection molding, foaming, compression molding, steam chest molding, super critical molding, additive manufacturing, and the like, to produce manufactured articles.

In one or more embodiments, polymer compositions may be formulated in some embodiments as an extruded filament or granule (or pellet) which may be used in an additive manufacturing process.

Generally, examples of commercially available additive manufacturing techniques include extrusion-based techniques such as fused filament fabrication (MJF), fused deposition modeling (FDM) or freeforming, as well as other techniques such as electro-photography (EP), jetting, selective laser sintering (SLS), high speed sintering (HSS), powder/binder jetting (BJ), and vat photopolymerization. For each of these techniques, the digital representation of the 3D part is initially sliced into multiple horizontal layers. For each sliced layer, a tool path is then generated, which provides instructions for the particular additive manufacturing system to print the given layer. Particular additive manufacturing techniques that may be particularly suitable for the present polymer compositions include, for example, fused filament fabrication and powder bed fusion (SLS, HSS, and BJ) techniques.

In fused filament fabrication, an extrusion head heats a plastic filament, producing a polymer melt that is extruded through a nozzle onto a printing substrate in a controlled pattern. The material is deposited to form successive layers. Filament may have a diameter, for example, of 1.0 to 4.0 mm, including for example filaments having a diameter ranging from 1.5 to 3 mm, such as a diameter of 1.75 mm or 2.85 mm, for example.

Powder bed fusion techniques use powdered material in the build area instead of liquid or molten resin. For example, in selective laser sintering (SLS), a laser is used to selectively sinter a layer of powder, which sinters the material together. The process is then repeated layer by layer until the build is complete. When the object is fully formed, it is left to cool in the machine before being removed. In high speed sintering (HSS), manufacturing occurs by depositing a fine layer of polymeric powder, after which inkjet printheads deposit an infrared (IR) absorbing fluid (or toner powder) directly onto the powder surface where sintering is desired. The entire build area is then irradiated with an IR radiation source such as an infrared lamp, causing the printed fluid to absorb this energy and then melt and sinter the underlying powder. This process is then repeated layer by layer until the build is complete. While SLS and HSS are detailed as examples of powder bed fusion techniques, it is also envisioned that the polymer compositions may be adapted for use in other powder bed fusion techniques such as selective heat sintering (SHS), selective absorbing sintering (SAS), selective inhibition sintering (SIS), and binder jetting. In such powder bed fusion techniques, the polymer composition may be provided as a powder having an exemplary particle size distribution d50 ranging from 30 to 90 microns, a d90 of up to 150 microns, and a d10 of at least 10 microns.

In one or more embodiments, the article is selected from the group consisting of a shoe midsole; a hot melt adhesive, a gasket, a hose, a cable, a wire, a sealing system, a conveyor belt, foxing tape, an NVH material, acoustic insulation, roofing material, and industrial flooring. In embodiments of a multilayer article, it is envisioned that at least one of the layers comprises the polymer composition of the present disclosure.

As mentioned above, articles formed from the polymer compositions may have stress and elongation at break, hardness, compression set, impact strength, density, tear strength, resilience, abrasion resistance, etc, that is equivalent to that formed from a non-crosslinked polymer without the dynamic crosslinked polymer therein. That is, the inclusion of the dynamic crosslinked polymer within a matrix of the non-crosslinked polymer does not have a negative impact on the properties of the article.

For embodiments that are expanded articles, such expanded articles may possess a density ranging from 0.2 to 0.6 g/cm$^3$ such as a density of 0.45 g/cm$^3$ or less, 0.43 g/cm$^3$ or less, 0.42 g/cm$^3$ or less, 0.41 g/cm$^3$ or less, 0.40 g/cm$^3$ or less, 0.38 g/cm$^3$ or less, 0.35 g/cm$^3$ or less, 0.32 g/cm$^3$ or less or 0.30 g/cm$^3$ or less in accordance ASTM D792.

Expanded articles in accordance with one or more embodiments of the present disclosure may have a Asker C hardness as determined by JIS K7312 that ranges from a lower limit of any of 15, 20, 25 30, or 35 to an upper limit of 40, 45, 50, 55, or 60 Asker C, where any lower limit can be paired with any upper limit.

Expanded articles in accordance with one or more embodiments of the present disclosure may have a resilience of at least 40%, at least 45%, at least 50%, at least 55%, at least 60%, at least 65%, or at least 70% as determined by ASTM D2632.

Expanded articles in accordance with one or more embodiments of the present disclosure may have an abrasion of 150 mm$^3$ or less, 140 mm$^3$ or less, 130 mm$^3$ or less, 120 mm$^3$ or less, 110 mm$^3$ or less, 100 mm$^3$ or less, 75 mm$^3$ or less or 50 mm$^3$ or less as determined by ISO 4649:2017 measured with a load of 5 N.

Expanded articles in accordance with one or more embodiments of the present disclosure may have a shrinkage of 3% or less, 2.8% or less, 2.5% or less, 2.3% or less, or 2.0% or less as determined by using the PFI method (PFI "Testing and Research Institute for the Shoe Manufacturing Industry" in Pirmesens-Germany) at 70° C.*1 h Expanded articles in accordance with one or more embodiments of the present disclosure may have a compression set of lower than 15%, lower than 12%, lower than 10%, or lower than 8% as determined by ASTM D395 using Method B at 23° C., 25% strain, for 22 hours.

Expanded articles in accordance with one or more embodiments of the present disclosure may have a compression set of lower than 50%, lower than 45%, lower than 40%, or lower than 35%, as determined by ASTM D395 using Method B at 50° C., 50% strain, for 6 hours).

Expanded articles in accordance with one or more embodiments of the present disclosure may have a tear strength of at least 3 N/mm, at least 3.5 N/mm, at least 4 N/mm, at least 4.5 N/mm, or at least 5 N/mm as determined by ASTM D624.

Expanded articles in accordance with one or more embodiments of the present disclosure may have a bonding strength of at least 2.5 N/mm$^2$, at least 3.0 N/mm$^2$, at least 3.5 N/mm$^2$, at least 4.0 N/mm$^2$, or at least 4.5 N/mm$^2$, as determined by ABNT-NBR 10456.

For embodiments that are compact articles, one or more embodiments of compact articles may possess hardness Shore A ranging from 60 to 70, rupture strength greater than 7 MPa, rupture elongation greater than 250%, compression set (NBR 10025, method B, 22 h, 70° C.) smaller than 35%, according to NBR 13756-1996.

In one or more particular embodiments, the polymer compositions may be used to form a shoe midsole, and the crosslinked polymer used to form the polymer composition may be EVA scrap, such as sprue, runners, flash, rejected parts, and the like from a shoe midsole molding operation, which is then ground or chopped. The ground EVA scrap may be combined with a catalyst, and optionally virgin EVA in an extruder to form the polymer compositions described here. The polymer compositions may thusly be used to form shoe midsoles.

Examples

Test Methodologies

Notched Izod Impact Resistance

Notched Izod Impact Test Testing was conducted on a Ceast Resil 25 Digital Pendulum Unit, Model 6545 per ASTM D256: Standard Test Methods for Determining the Izod Pendulum Impact Resistance of Plastics, Method A. Pendulum Capacity: 2.0 Joule unless noted. Sample Size: dimensions Notch depth: 0.1 in Number of specimens tested per sample type: 5 (minimum) Test Temperature: Samples were at room temperature 23° C. during testing.

Flexural Modulus

3-Point Flexural Test Testing was conducted on an Instron 3366 unit with Bluehill Universal software applying principles of ASTM D790, Procedure A—Flexural Properties of Unreinforced and Reinforced Plastics and Electrical Insulating Materials, Procedure A. Strain Rate: See Results Below Crosshead Speed: See Results Below Samples Size: 0.125" thickness×0.5" width×5.0" length Support Span: 2 inches Number of specimens tested per sample type: 5 at each strain rate 3-Point Flexural Test Results Test Conditions: Speed—0.05 in./min, Span—2.0 in.

Tensile Properties

Tensile Test Testing was conducted on an Instron 3366 unit with Bluehill Universal software applying principles from ASTM D638 Tensile Properties of Plastics. A 10 kN load cell was used. A long travel extensometer was used to determine strain values. Crosshead Speed: 2.0 inches/minute Sample Size: ASTM Type I Dog bone Sample Gage Length: 2.0 inches.

Dynamic Mechanical Analysis

Dynamic mechanical analysis was conducted using an Anton Parr MCR 501 with the single cantilever fixture.

Differential Scanning Calorimetry

To illustrate the formation of dynamically-crosslinked networks, thermal responses were measured by differential scanning calorimetry (DSC) a Q200 instrument manufactured by TA Instruments.

DSC Method:

In a first heating step, samples were heated to 160° C. at a heating rate of 10 C/minute. Temperature was held constant at 160° C. Samples were then cooled to −20° C. at a rate of 10° C./minute and equilibrated at −20° C. for 1 minute. In a second heating step, samples were heated to 160° C. at a heating rate of 10° C./minutes, held at 160° C. for 1 minute, then cooled to 30° C. at a rate of 10° C./minute.

Shear Rheology

Shear rheology test was conducted by the following: first, a frequency sweep, followed immediately by a time sweep, and then, a further frequency sweep. Comparison among samples were performed after different thermal cycles, and in different frequencies, in order to understand possible effects of the catalysts over the polymeric composition. All tests were performed at 170° C., in a nitrogen ($N_2$) atmosphere, in a Dynamic Shear Oscillatory Rheometer DHR3 by TA Instruments, in a parallel plate accessory, with a diameter of 25 mm and gap of 1 mm.

Test conditions—First: Frequency sweep from 628.32 to 0.75 rad/s, deformation within the linear viscoelastic region (LVR). The time sweep was performed in the LVR at 1 rad/s for 60 minutes. The second frequency sweep was performed in the LVR from 628.32 to 0.06 rad/s.

Stress Relaxation

Stress relaxation measurements were obtained using an Ares G2 rheometer with 25 mm parallel plate fixture. The gap was set to 1.5 mm. The strain was set to 1% (within the linear range.) An axial force of 5N was applied. The test was conducted at each of four temperatures for each sample (100° C., 120° C., 150° C., and 170° C.)

Melt/Mixing of Ground EVA Scrap with EVA Plus Dynamic Crosslinking Agents

Elastomeric networks were produced by reactive extrusion of an ethylene-vinyl acetate copolymer (EVA) with ground EVA scrap plus a zinc/carboxylic acids salt. Conventional EVA (Braskem commercial grade HM728, VAc content 28%, Melt Index (190° C./2.16 kg=6 g/10 min) was melt/mixed in a Theysohn TSK 21 mm twin screw extruder with ground, peroxide-crosslinked EVA scrap and zinc-centered dicarboxylic acid salts. The extrusion conditions and mechanical properties are summarized in Table 2 and Table 3, respectively.

Crosslinked EVA scrap foam was obtained from a commercial midsole manufacturer and ground to form fine particles using an extruder operating at 190° C.

Typical midsole compositions include: EVA polymer, inorganic salts such as CaCO3 (1-5 wt %), blowing agent such as azodicarbonamide (2-3 wt %) and dicumyl peroxide curing agent (0.5-2 wt %). Particle size distribution of the ground scrap was measured by laser diffraction using a Mastersizer instrument manufactured by Malvern. Average particle size was approximately 300 microns.

Examples 1 and 2 illustrate EVA extruded with ground EVA scrap without the addition of a dynamic crossinking agent. Examples 2 and 3 illustrate the effect of extruding zinc diacrylate with blends of EVA and ground EVA scrap. Examples 4 and 5 illustrate the effect of extruding zinc acetyl acetenoate with blends of EVA and ground EVA scrap.

TABLE 1

Sample formulations

| | Base resin (wt %) | Filler (wt %) | Catalyst (wt %) | |
|---|---|---|---|---|
| Sample No. | EVA HM728 | EVA Scrap | Zinc diacrylate | Zn acetyle acetenoate |
| Example 1 | 85 | 15 | | |
| Example 2 | 70 | 30 | | |
| Example 3 | 84 | 15 | 1.5 | |
| Example 4 | 67 | 30 | 3 | |
| Example 5 | 84 | 15 | | 1.2 |
| Example 6 | 68 | 30 | | 2.4 |

TABLE 2

Extrusion conditions

| | Extruder temperature (° C.) | | | | | | | Screw |
|---|---|---|---|---|---|---|---|---|
| Sample No. | Zone 1 | Zone 2 | Zone 3 | Zone 4 | Zone 5 | Die | % Torque | speed, rpm |
| Example 1 | 158 | 159 | 159 | 157 | 154 | 150 | 54 | 266 |
| Example 2 | 154 | 159 | 159 | 156 | 157 | 152 | 51 | 265 |
| Example 3 | 154 | 159 | 159 | 156 | 157 | 153 | 56 | 266 |
| Example 4 | 154 | 160 | 160 | 156 | 154 | 148 | 69 | 270 |
| Example 5 | 157 | 159 | 161 | 156 | 155 | 150 | 56 | 268 |
| Example 6 | 153 | 159 | 160 | 155 | 154 | 149 | 64 | 269 |

The resulting extrudate mixtures were cooled in a water bath and collected as pellets. A sub-set of pelletized samples were dried for at least 8 hours at 60° C. in a convection oven, then molded according to ASTM methods to produce test specimen bars. Mechanical properties were measured using ASTM procedures, and the results are reported in Table 3.

The fact that the inventive compositions were readily processed using conventional (standard) injection molding method for thermoplastics illustrates their melt processability.

TABLE 3

| Sample No. | Sample characterization | | | | |
|---|---|---|---|---|---|
| | Flexural modulus, psi | Izod impact resistance | Tensile modulus, psi | Peak tensile stress, psi | Tensile elongation at break, % |
| Example 1 | 5087 | 1.5 | 1949 | 1490 | 327 |
| Example 2 | 5977 | 1.6 | 2975 | 1174 | 202 |
| Example 3 | 5302 | 1.5 | 1787 | 1884 | 413 |
| Example 5 | 5123 | 1.5 | 1505 | 1791 | 408 |

Dynamic Mechanical Analysis

To demonstrate the formation of an elastomeric network upon blending EVA with Zn/carboxylic acid salts, dynamical mechanical analyses were conducted on molded plaques (17.5 mm×13.95 mm×1.5 mm) using single cantilever geometry. Samples were equilibrated at 150° C. for 5 mins, then the temperature was increased by 3.00° C./min to 50° C.

Figure 2:
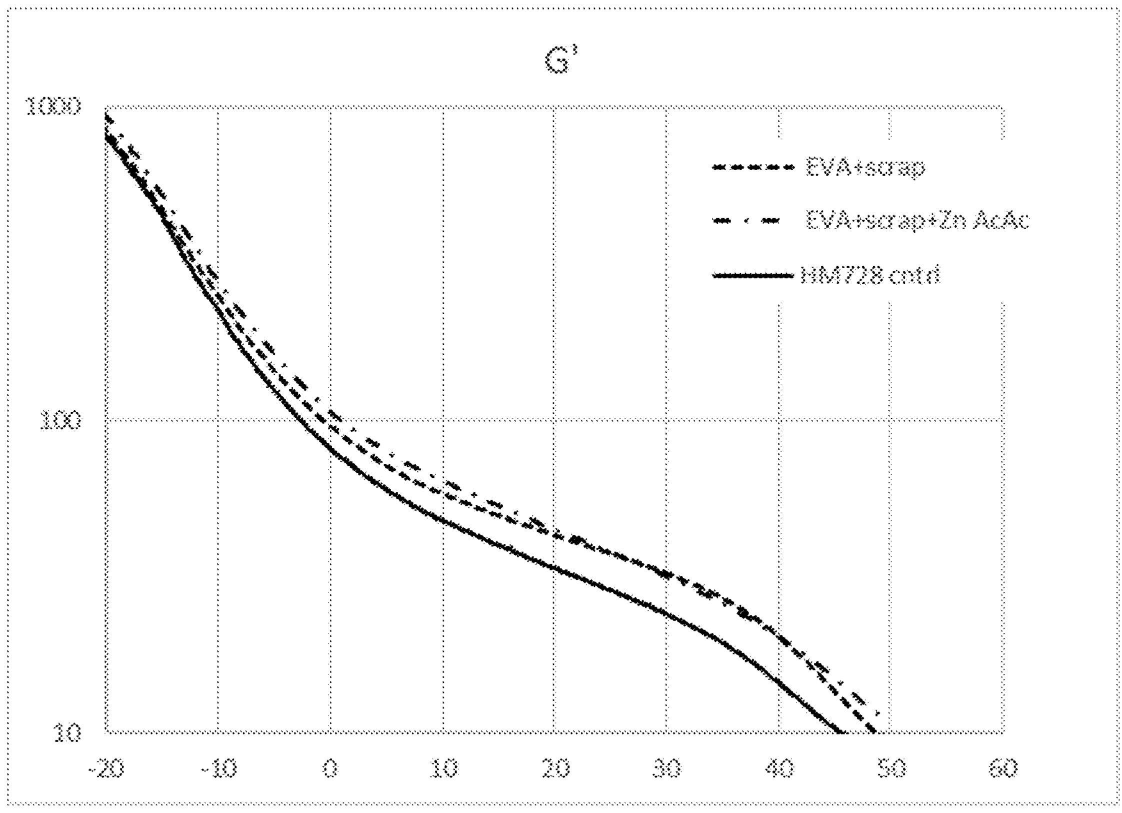
Figure 3:
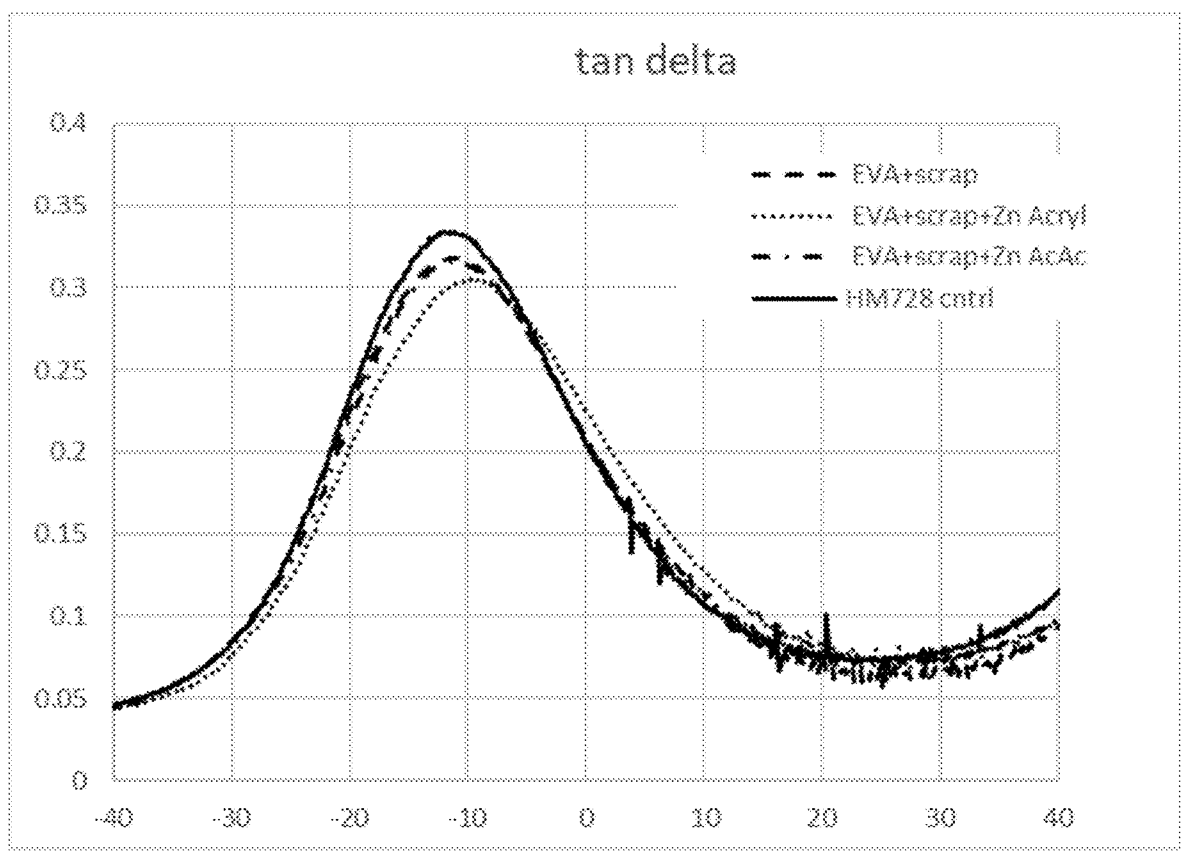

Storage modulus and tan delta values observed in the 15-30° C. temperature range, as shown in FIGS. 1-3, clearly demonstrate that adding the zinc carboxylate salts to EVA increase the elastomeric responses. Modulus values at 25° C. are reported Table 4 below.

TABLE 4

| Sample No. | Modulus values at 25 °C. of Samples | | |
|---|---|---|---|
| | Storage Modulus, MPa | Loss Modulus, MPa | Tan Delta |
| HM 728 EVA (control) | 28.7 | 2.1 | 0.07 |
| Example 2 | 37.7 | 2.6 | 0.07 |
| Example 4 | 40.7 | 3.0 | 0.07 |
| Example 6 | 38.1 | 2.8 | 0.07 |

Differential Scanning Calorimetry

Figure 4:
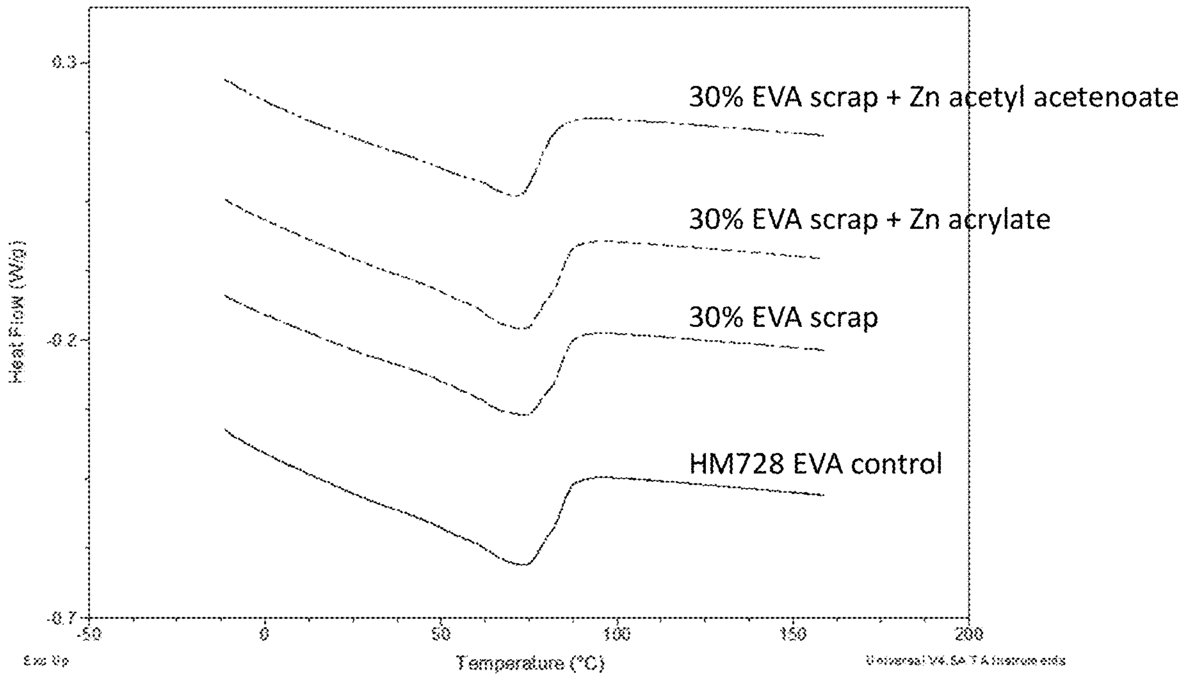
FIGS. 4-5 show thermal responses of various samples after reactive extrusion.

To further illustrate the formation of an elastomeric network upon blending EVA with Zn/carboxylic acid salts, DSC was used to measure thermal responses of the EVA scrap blends after reactive extrusion. Melting curves are reported for a second melt after a heating and cooling cycle, according to FIG. 4. The melting peaks for all blends containing EVA scrap are similar to the melting curve for an EVA control sample. The inclusion of 30% scrap leads to a broader peak but does not shift the peak melting temperature significantly.

Figure 5:
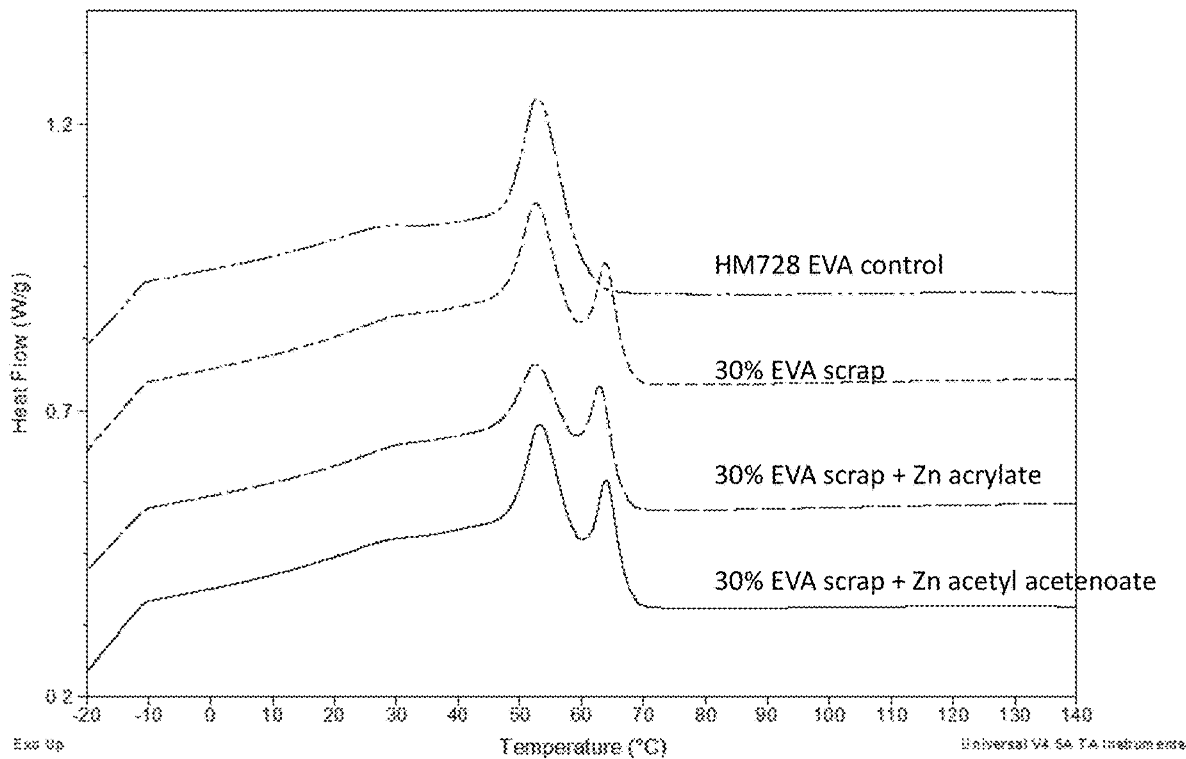
Figure 6:
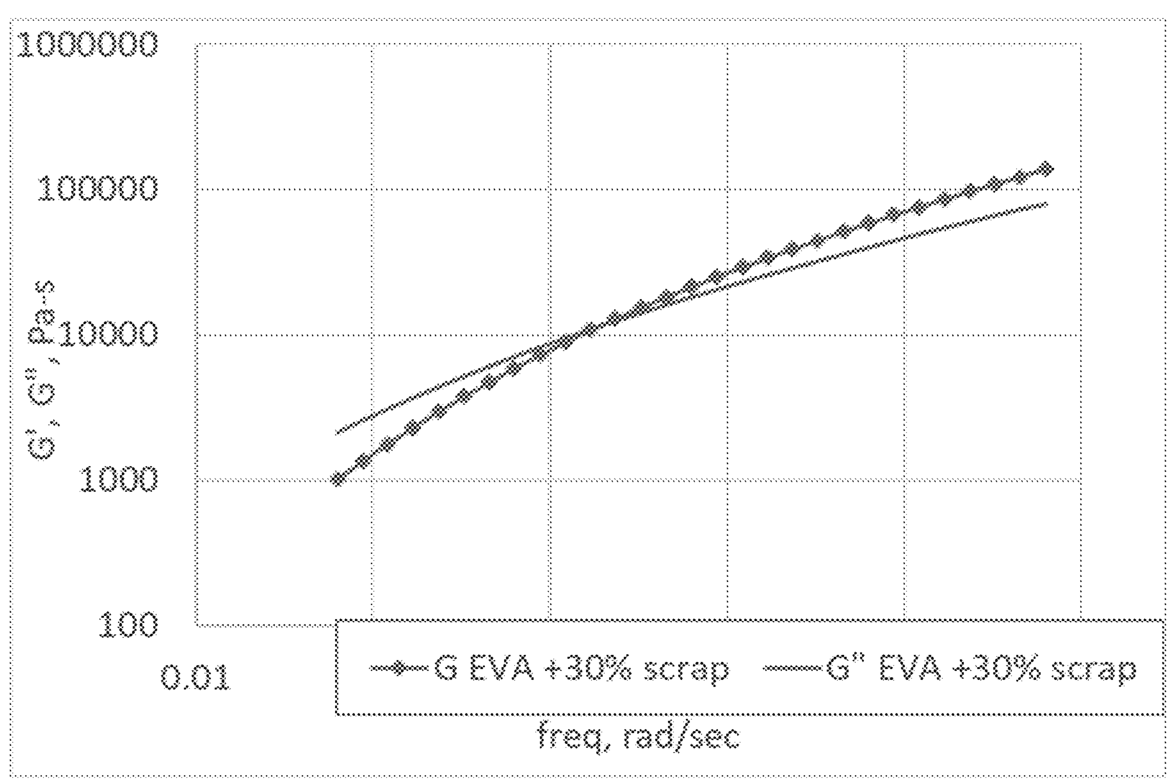
Figure 7:
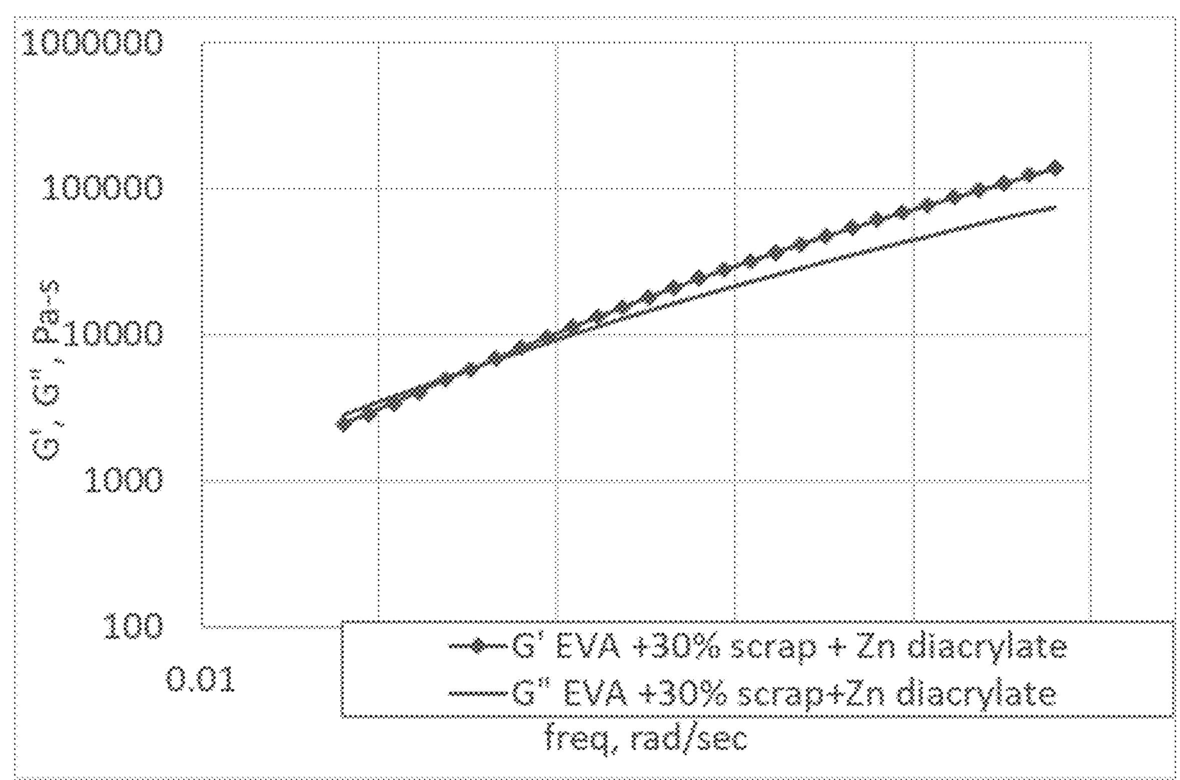

Cooling curves, shown in FIG. 5, for the samples containing ground EVA scrap exhibit two distinct crystallization peaks, one in the same temperature as the EVA control and one at a higher temperature that may be attributed to the ground scrap.

The lower-temperature crystallization peak shifts to significantly lower temperature when zinc diacrylate or zinc acetyl acetenoate is extruded with the ground scrap and EVA. Unblended EVA HM728 has a Tc peak at about 54° C., and the EVA blended with ground scrap has a Tc peak at about 52° C. The samples that were extruded with Zn diacrylate or Zn acetyl acetenoate have Tc peaks at about 43° C.—a shift of nearly 10 degrees C. This shift suggests crosslinking of the EVA/scrap blends upon the extrusion with either Zn diacrylate or Zn acetyl acetenoate.

Shear Rheology

Small angle oscillatory shear (SAOS) was used to measure the viscoelastic responses at higher temperature, as shown in FIGS. 6-9. At 170° C., the sample containing Zn diacrylate, shown in FIG. 7, exhibited a significantly lower crossover frequency than the sample containing only scrap, shown in FIG. 6. The sample containing Zn diacrylate also exhibited a significantly lower tan delta peak than the sample containing only scrap, as shown in FIG. 9. These observations point to elastomeric behavior well above the melting point of the EVA, indicating that a crosslinked network has formed.

Stress/Relaxation Measurements

Stress relaxation measurements were conducted to demonstrate that the inventive networks are dynamically crosslinked and can therefore change morphology in response to a stimulus such as increased temperature.

The samples tested were the inventive compositions described above in Example 2, Example 4, and Example 6.

Figure 12A:
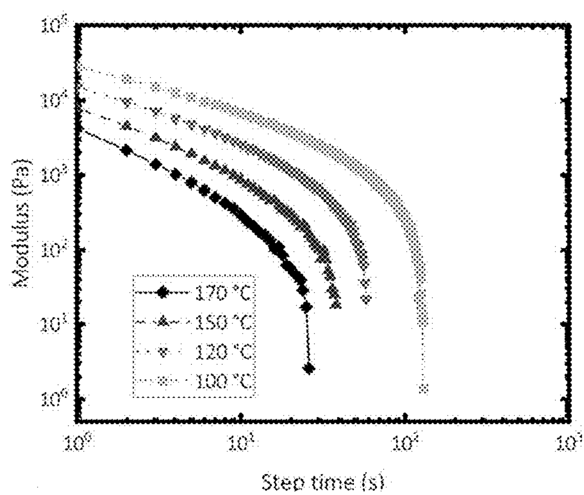
Figure 12B:
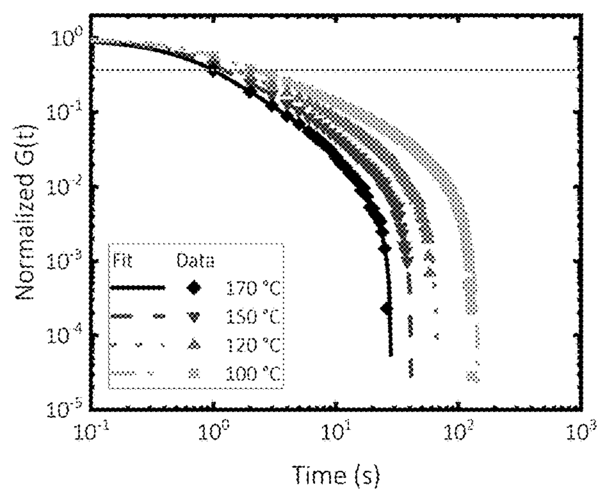

Stress relaxation results, shown in FIGS. 10, 11, and 12, demonstrate that the storage modulus (G') is time-dependent at each temperature tested. For each of the inventive materials, G'=G'(t) The value of G'(t) decreases to less than 50% of G(t=0), within 10,000 seconds for each of the EVA/scrap compositions. The value for G(t=0) was obtained via exponential decay fits to the data. The relaxation modulus corresponds to the fit at t=0 s, which is also referred to as Go.

Re-Processing Experiments

To illustrate that the inventive compositions can be reprocessed by heating and melting, extruded pellets were pressed multiple times in a Carver press using the conditions listed in the Table below. Pellet samples were pressed between steel plates, using a 0.6 mm-thick brass mold to control sample thickness. After a first pressing step, the film was cooled, cut into small pieces, and pressed again to form a second film. The second film was cut into small pieces, and pressed to form a third film. After each press, a sample of film was collected for dynamic mechanical analysis.

| | | |
|---|---|---|
| 1st press | 5 min @ 110° C. | 15 min @ 160° C., 20 bar |
| $2^{nd}$ & $3^{rd}$ press | 5 min @ 110° C. | |

The Inventive samples provided a smooth, uniform film after each pressing, demonstrating that the composition flowed to take the shape of the mold.

Viscoelastic responses of the pressed films were measured by dynamic mechanical analysis (DMA) temperature sweep using a rheometer manufactured by TA Instruments outfitted with a tension fixture. Sample dimensions were 0.6 mm thick, 7 mm wide, and 22-26 mm long. Strain amplitude was 15 microns, frequency was 1 Hz, and heating rate was 3 degrees C. per minute.

Figure 13:
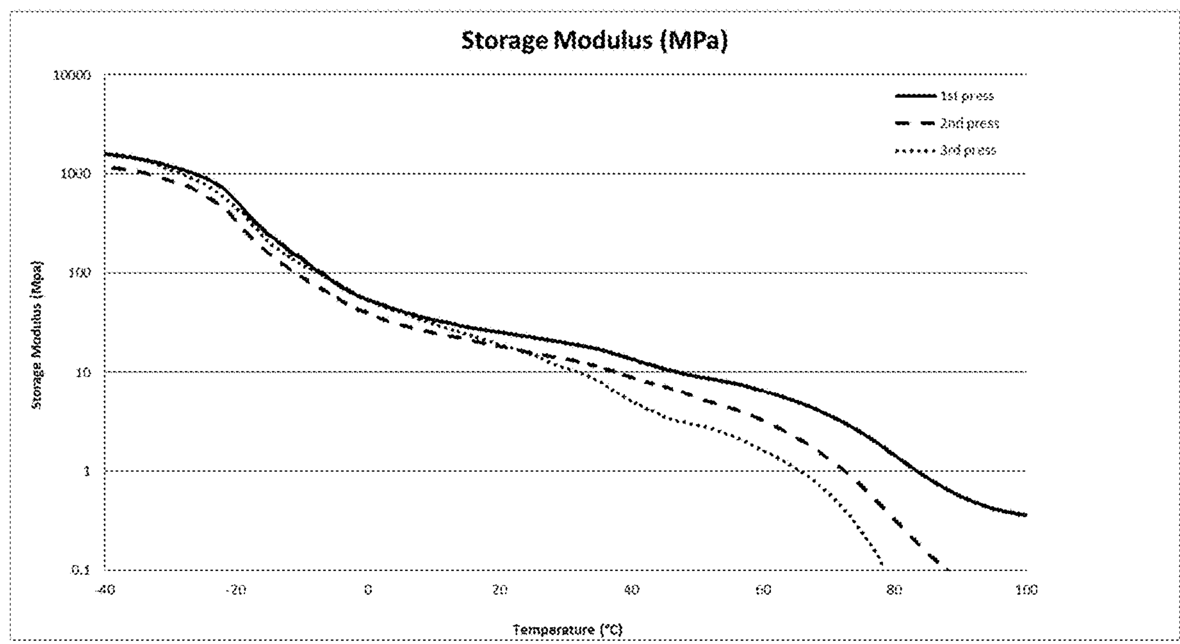
FIGS. 13-15 show the results of reprocessing various samples.
Figure 14:
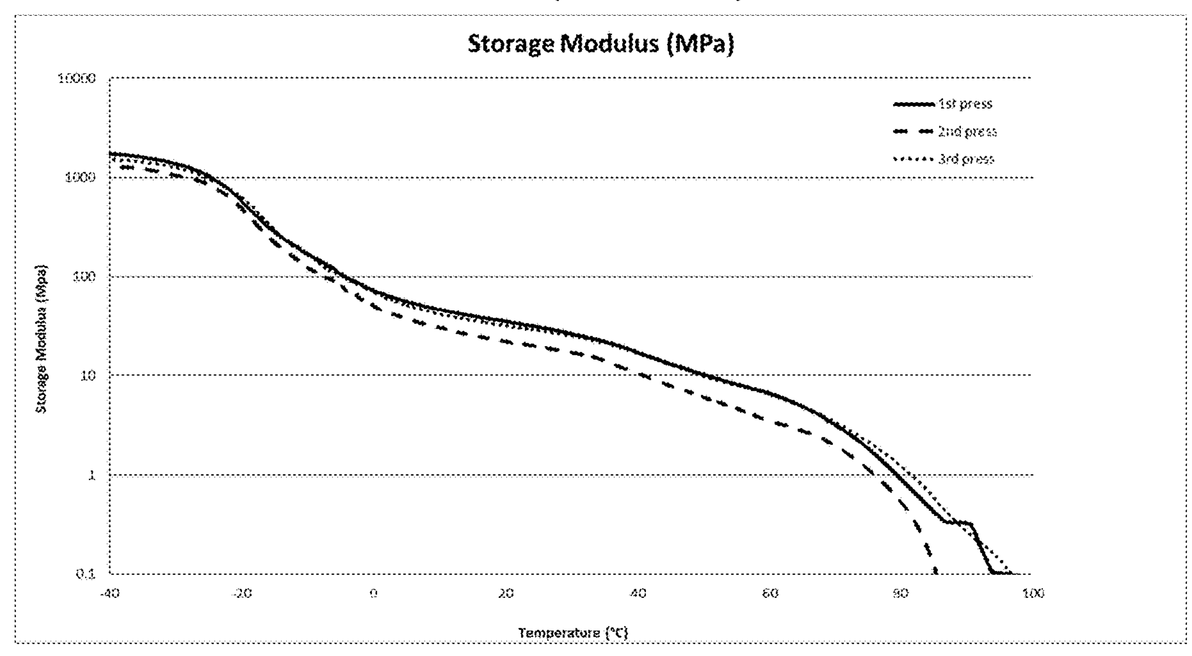
Figure 15:
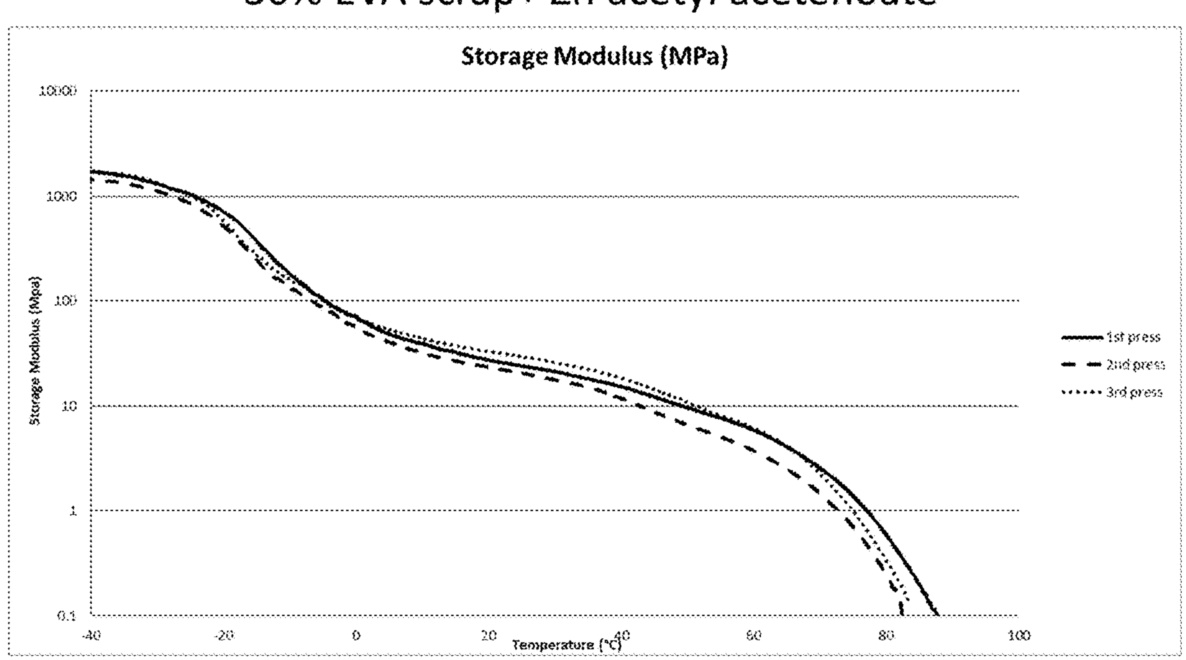

Elastic modulus and storage modulus values are reported as a function of temperature. As shown in FIGS. 13-15, the inventive composition exhibits a plateau storage modulus over temperatures ranging from about 20° C. to about 80° C. After three processing steps, the plateau modulus of the inventive composition retains at least half of its initial value, which is taken to be the value of E' after the first pressing.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plusfunction clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of any of the claims herein, except for those in which the claim expressly uses the words 'means for' together with an associated function.

What is claimed:

1. A method, comprising:

processing a previously-crosslinked polymer and a bond-exchanging, dynamic crosslink promoting catalyst to form a dynamic crosslinked polymer during a melt processing operation, the crosslinked polymer comprising at least one monomer selected from a vinyl ester, a C2-C12 olefin, and combinations thereof, wherein a non-crosslinked polymer is also present during the melt processing operation, wherein the non-crosslinked polymer comprises at least one monomer selected from a vinyl ester, a C2-C12 olefin, and combinations thereof.

2. A method, comprising:

mixing a previously-crosslinked polymer, a bond-exchanging, dynamic crosslink promoting catalyst, and a non-crosslinked polymer at a temperature higher than a processing temperature of the non-crosslinked polymer to form a polymer composition;

wherein each of the crosslinked polymer and the non-crosslinked polymer comprise at least one monomer selected from a vinyl ester, a C2-C12 olefin, and combinations thereof, and wherein the crosslinked polymer is present in an amount that is at least 15 wt %, relative to the combined total of crosslinked polymer and non-crosslinked polymer.

3. The method of claim 2, wherein the crosslinked polymer is previously-processed.

4. The method of claim 2, wherein the mixing is performed in a continuous or batch mixing equipment.

5. The method of claim 2, wherein the polymer composition comprises a matrix phase of the non-crosslinked polymer, and a dispersed phase of a dynamic crosslinked polymer.

6. The method of claim 2, wherein the crosslinked polymer is an ethylene vinyl acetate copolymer.

7. The method of claim 6, wherein the ethylene vinyl acetate has a melt flow, measured according to ASTM D1238, 2.16 kg at 190° C., ranging from 0.1 to 300 g/10 min.

8. The method of claim 6, wherein the ethylene vinyl acetate copolymer has a vinyl acetate content ranging from 5 to 80 wt %.

9. The method of claim 2, wherein the non-crosslinked polymer is a virgin polymer.

10. The method of claim 2, wherein the non-crosslinked polymer is ethylene vinyl acetate copolymer.

11. The method of claim 2, wherein the non-crosslinked polymer is a terpolymer of ethylene, vinyl acetate, and a branched vinyl ester.

12. The method of claim 2, wherein the catalyst is a metal salt selected from the group consisting of metal salts, metal oxides, metal alkoxides, metal acrylates, metal acetyl acetenoates, metal hydrides, metal halides, and metal hydroxides.

13. The method of claim 2, wherein the catalyst is selected from borates, diamines, diols, diacids, dianhydrides, and combination thereof.

14. The method of claim 2, further comprising: grinding the crosslinked polymer prior to the mixing.

15. The method of claim 2, wherein the crosslinked polymer has a particle size ranging from 1 to 100000 microns.

16. The method of claim 2, further comprising: adding to the polymer composition at least one additive selected from the group consisting of filler, fibers, elastomer, plasticizer, processing aid, mold release, lubricant, dye, pigment, antioxidants, light stabilizers and flame retardant.

17. The method of claim 2, further comprising: combining the polymer composition with a blowing agent, an accelerant, and a curing agent.

18. The method of claim 17, further comprising: expanding the polymer composition.

19. The method of claim 2, further comprising: a molding operation of the polymer composition.

20. The method of claim 19, wherein the molding operation is selected from the group consisting of injection molding, compression molding, steam chest molding, super critical foaming, and additive manufacturing.

21. The method of claim 2, further comprising extruding the polymer composition as a filament.

22. The method of claim 21, wherein the filament has a diameter ranging from 1.5 to 3 mm.

23. The method of claim 2, further comprising extruding the polymer composition as pellets.

* * * * *